April 11, 1961
R. S. HINSEY
2,978,926
MECHANISM CONTROL
Filed March 25, 1958
2 Sheets-Sheet 2
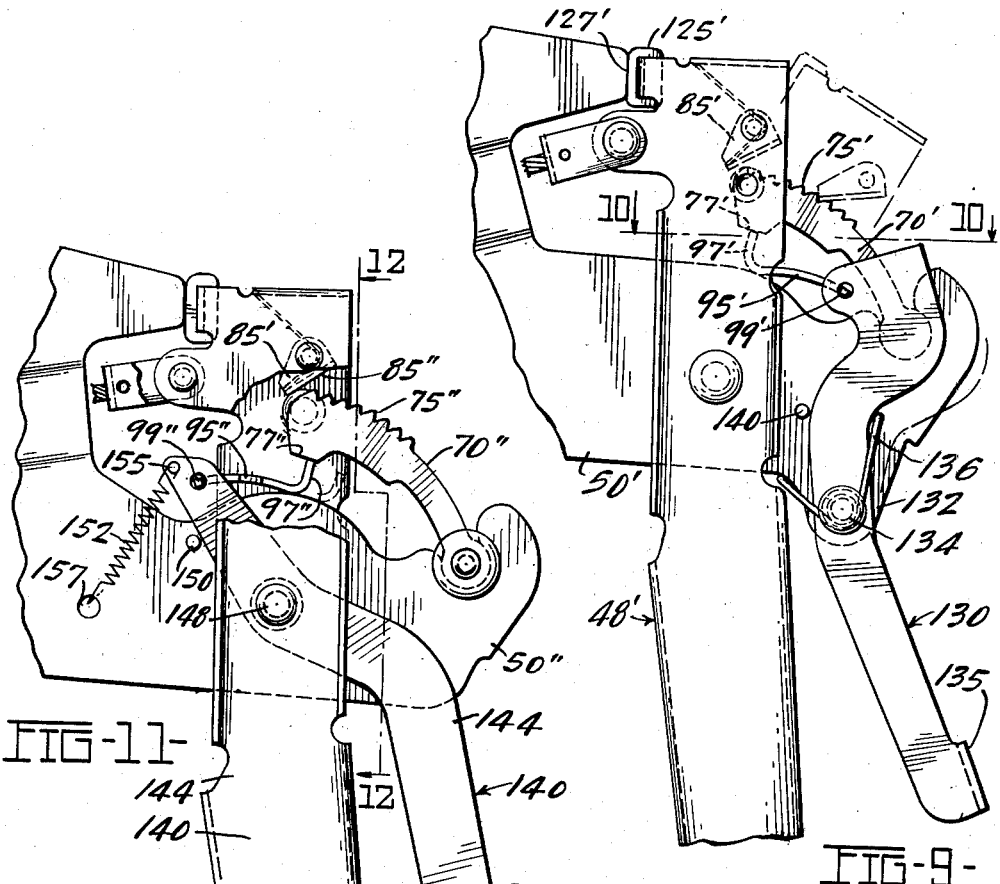
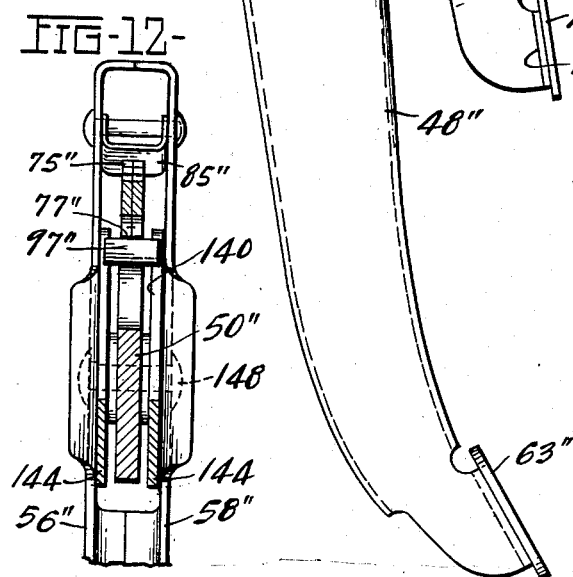
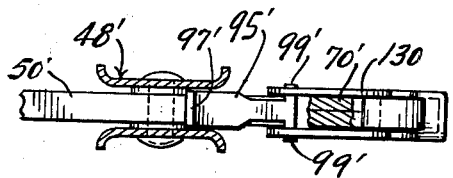
INVENTOR:
ROBERT S. HINSEY.
BY
Harry O. Ernsberger
ATTORNEY United States Patent Office 2,978,926
Patented Apr. 11, 1961

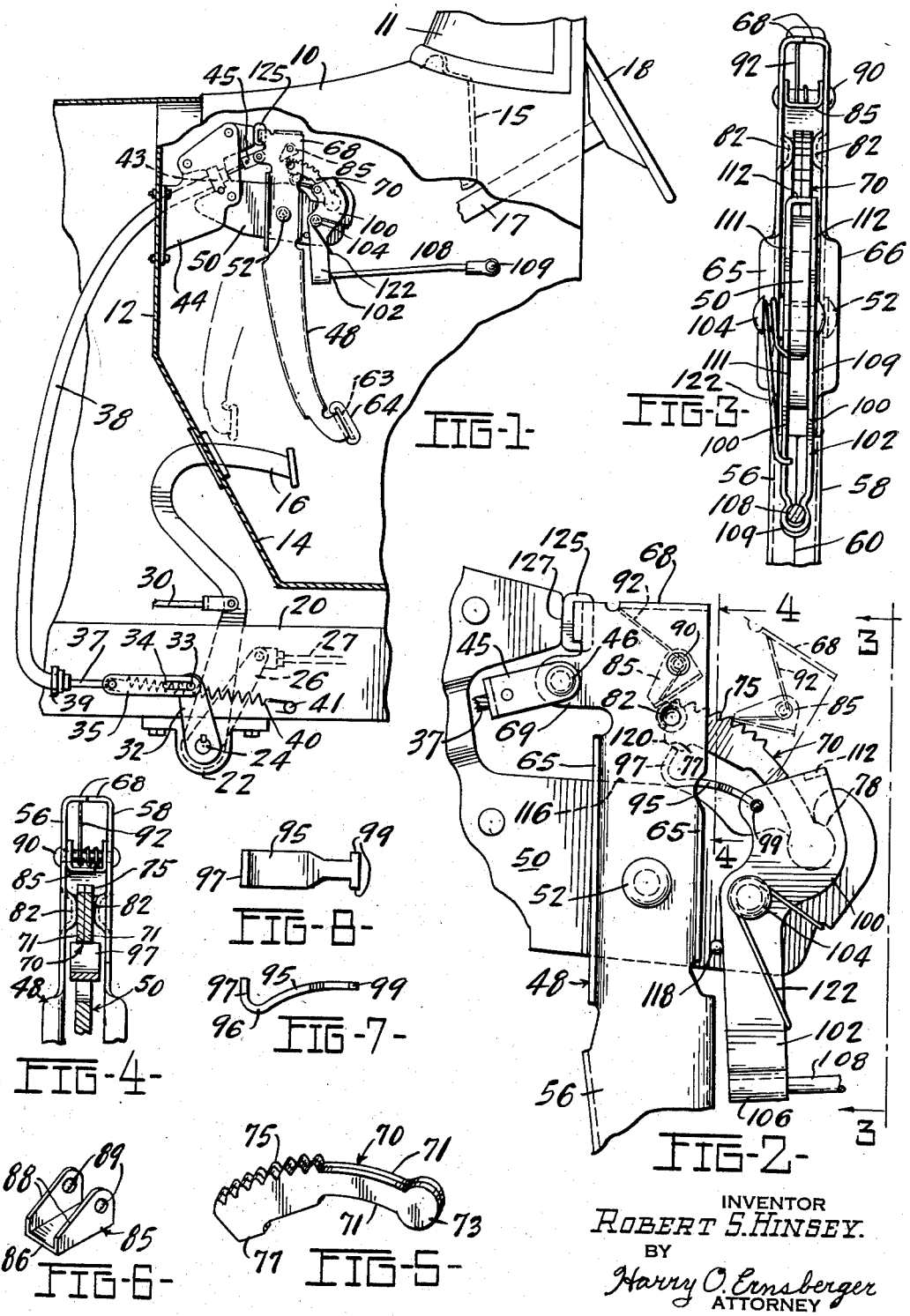

2,978,926

MECHANISM CONTROL

Robert S. Hinsey, Toledo, Ohio, assignor to The Bingham-Herbrand Corporation, Toledo, Ohio, a corporation of Ohio Filed Mar. 25, 1958, Ser. No. 723,683

5 Claims. (Cl. 74—534)

This invention pertains to mechanism control and more especially to means or mechanism for actuating or controlling the parking or emergency brakes of a vehicle.

Heretofore various forms of both hand-operated and foot-operated actuating or controlling devices and mechanisms have been developed and utilized for actuating and controlling the parking brakes of automotive vehicles. Hand-operated levers have been utilized extensively for the purpose, these constructions embodying a manually controlled pawl carried by the lever and arranged for cooperation with a stationary toothed sector or ratchet member for holding the lever in set position.

In installations of this character, a manually-operated member is connected to the pawl so that upon manipulation of such member, the pawl is withdrawn from engagement with the sector teeth and held in such position while the brake setting lever is manually moved to brake release position. In such installations there is little liability of stripping or damaging the ratchet teeth by engagement of the pawl with the ratchet during release movement of the lever because the release means is manually held in lever-releasing position during the entire movement of the brake actuating lever to brake release position.

With the trend in automotive vehicle development to lower vehicle bodies, the increased use of the space between the dashboard or firewall and the instrument panel for instrumentation purposes, and the increase in force required to actuate vehicle brake mechanisms, foot actuated mechanisms or pedal levers have been developed and used for controlling the parking brakes of a vehicle. Foot actuated devices of this character embody friction clutch means or a clutch roller for retaining the pedal lever in brake setting position, the clutch roller being released either by manually-operated means or a supplemental foot-operated lever means.

Foot-operated mechanisms embodying pawl means associated with the foot-operated lever and arranged for cooperation with a fixed sector having teeth formed thereon have been developed but have not come into extensive use primarily for the reason that the pawl releasing means has been controlled independently of the foot-operated brake actuating lever, and a vehicle operator could prematurely release control of the pawl operating member prior to complete return of the foot-operated lever to brake released position. If premature return of the pawl into engagement with the sector teeth takes place while the foot-operated lever is moving to brake release position, serious damage may occur to the teeth of the sector or result in breakage of the pawl.

The present invention embraces a foot-operated lever arrangement arranged to be connected with a vehicle parking brake mechanism and embodying a pawl and toothed sector means for holding the lever arrangement in brake setting positions which is reliable in its operation and not liable to be damaged during operation.

An object of the invention is the provision of a foot-operated lever arrangement for actuating and controlling the parking or emergency brakes of a vehicle embodying a pawl and toothed sector lever retaining means of a character which may be arranged to be released by a manually actuated means or which may be released by a foot-operated means.

Another object of the invention is the provision of a foot-operated lever arrangement for actuating and controlling parking or emergency brakes embodying a pawl and toothed sector means for retaining the lever arrangement in brake setting positions wherein the toothed sector is articulately supported and is adapted to be held in operative or effective position through the medium of a drawbar member arranged to be manipulated by the vehicle operator to effect a release of the brake mechanism through disengagement of the movable sector from the pawl.

Another object of the invention is the provision of a foot-operated brake actuating mechanism embodying a lever retaning means in the form of a toothed sector or arm and pawl construction wherein the toothed sector is articulately supported for movement into and out of engagement with the pawl in combination with a sector releasing means which may be manually-operated or which may be foot-operated through the medium of a supplemental lever mounted upon a support or pivotally associated with the brake actuating lever.

Still another object of the invention is the provision of a foot-operated lever arrangement for actuating and controlling vehicle brake mechanism embodying a lever retaining means in the form of a toothed or serrated sector and pawl means wherein the toothed sector may be swung to an ineffective position by a drawbar arrangement or abutment means whereby the sector may be swung or moved out of the path of the pawl during movement of the foot-operated lever construction toward brake releasing position whereby the liability of damage to the teeth of the sector or to the pawl is substantially minimized or eliminated.

Further objects and advantages are within the scope of this invention such as relate to the arrangement, operation and function of the releated elements of the structure, to various details of construction and to combinations of parts, elements per se, and to economies of manufacture and numerous other features as will be apparent from a consideration of the specification and drawing of a form of the invention, which may be preferred, in which:

Figure 1 is an elevational view of a portion of an operator's compartment of a vehicle, certain parts being broken away, illustrating a form of mechanism control of my invention installed in a vehicle;

Figure 2 is an enlarged side elevational view of the upper portion of the lever arrangement illustrated in Figure 1;

Figure 3 is a rear elevational view of the lever arrangement, the view being taken substantially on the line 3—3 of Figure 2;

Figure 4 is a fragmentary detail sectional view taken substantially on the line 4—4 of Figure 2;

Figure 5 is an isometric view of a toothed sector construction forming a component of the lever retaining means;

Figure 6 is an isometric view of a pawl construction adapted for cooperation with the toothed sector;

Figure 7 is an elevational view of a drawbar or abutment member adapted for controlling the position of the toothed sector;

Figure 8 is a plan view of the drawbar shown in Figure 7;

Figure 9 is an elevational view of the foot-operated brake actuating lever arrangement embodying a foot-operated supplemental lever for controlling the relative position of the movable sector;

Figure 10 is a sectional view taken substantially on the line 10—10 of Figure 9;

Figure 11 is an elevational view of the foot-operated lever arangement embodying a supplemental foot-operated lever pivotally mounted at the fulcrum of the main foot-operated lever for controlling the position of the movable sector, and Figure 12 is a sectional view taken substantially on the line 12—12 of Figure 11.

While the forms of mechanism control of the invention and the release arrangement therefor illustrated are particularly adapted for installation in automotive vehicles and utilized for actuating or controlling the emergency or parking brakes of a vehicle, it is to be understood that the arrangements of the invention may be utilized for controlling or actuating other forms of mechanism wherever the same may be found to have utility.

Referring to the drawings in detail, Figures 1 through 8 inclusive illustrate a form of mechanism control of the invention, Figure 1 illustrating the installation of the foot-operated arrangement in the vehicle operator's compartment of a vehicle. With particular reference to Figure 1, there is illustrated a portion of a vehicle including a cowl section 10, a windshield 11, a dashboard or firewall 12, a toe board 14, an instrument panel 15, a service brake actuating pedal or member 16, a steering post 17 and a steering wheel 18.

The chassis of the vehicle includes a frame construction embodying a pair of parallel transversely spaced side frame members 20, one of which is shown in Figure 1 which are joined by transverse cross-members (not shown). Secured to the frame members 20 are brackets 22, one of which is illustrated in Figure 1, in which is journally supported a transversely extending shaft 24. Fixed upon the shaft 24 is an upwardly extending arm 26 adapted to be connected by a rod 27 or other suitable mechanical means with the parking brakes of the vehicle (not shown) associated with a pair of road wheels of the vehicle, the parking brakes being of conventional construction.

The service brake pedal 16 may also be journaled upon the shaft 24 and, through the medium of a rod 30 is arranged to actuate conventional hydraulic mechanism for setting the service brakes of the vehicle. Also secured upon the shaft 24 is an upwardly extending arm 32 provided at its distal end with a pin 33 which extends into and is adapted for traverse in a slot 34 formed in a link or member 35. One end of a flexible cable 37 is secured to the link or member 35, the cable being enclosed or encased within a tubular sheath 38, the lower end of which is secured to a frame member 20 by means of a clip 39.

One end of a contractile spring 40 is connected with the member 35, the other end of the spring being anchored to a pin 41 carried by a frame member 20. The spring 40, in conjunction with the conventional brake return springs (not shown) serve to normally bias the link 35 in a right-hand direction as viewed in Figure 1 toward brake release position. The guide sheath or closure 38 for the flexible cable 37 extends through an opening in the firewall or dashboard 12, as shown in Figure 1, the upper end of the sheath being secured by means of a clip 43 to a member or bracket 44 secured to the firewall.

The upper end of the brake actuating cable 37 is equipped with a clevis 45 which is connected by means of a pin or rivet 46 with a foot-operated, brake actuating lever construction 48 for actuating or controlling the parking or emergency brakes of the vehicle. The mechanism control of the invention includes the foot-operated lever or pedal construction 48, a lever retaining means for holding the lever construction in adjusted or brake setting positions and a release means for the lever retaining means. Secured to the bracket 44 is a member 50 which forms a support for the foot-operated lever construction.

As shown in Figures 1 and 2, the foot-operated or main lever construction 48 is articulately or pivotally mounted on the support 50 as by means of a pin or rivet 52 which forms a fulcrum for the lever 48. The lever construction 48 is preferably formed of sheet metal of two mating sections 56 and 58, the lower portions of which are of channel shaped configuration in cross-section, the inwardly extending flange portions of the channel configuration being arranged in abutting relation, the abutting portions of the flanges being welded together along a juncture line 60 as shown in Figure 3.

The lower extremities of the lever sections 56 and 58 are shaped as shown in Figure 1 and secured to the ends thereof is a metal foot pad 63 which may, if desired, be faced or covered with a pad 64 of rubber or other suitable nonmetallic material. As particularly shown in Figure 3, the lever sections or components 56 and 58 straddle the uniplanar support 50 and are formed with aligned openings to accommodate the fulcrum pin or rivet 52. The regions of the lever sections adjacent the support are formed with outwardly extending flanges 65 and 66 for reinforcing this portion of the lever 48.

The upper ends of the lever sections 56 and 58 are respectively formed with inwardly extending abutting flanges 68 which are welded together. The lever sections are formed with extensions 69 provided with aligned openings to receive the clevis pin 46 as shown in Figures 1 and 2 connecting the clevis 45 with the lever 48. As viewed in Figure 1, a clockwise movement of the lever 48 about the fulcrum 52 exerts an upward pull upon the cable 37 to set the parking or emergency brakes of the vehicle through the actuation of the brake rod 27.

The arrangement of the invention includes a toothed member, sector or ratchet construction 70 and a cooperating pawl 85 providing a means for retaining the lever 48 in adjusted or brake setting positions. The toothed sector construction or means in the embodiment illustrated comprises a pair of identically shaped members 71 particularly shown in Figure 5. Each of the members 71 is formed with a circular end portion 73, an elongated portion formed with a plurality of ratchet teeth 75 and an abutment surface or ledge 77. It should be noted that the member 70 is of curved shape and the sector teeth 75 are arranged in an arc generated about the axis of the fulcrum 52.

The support 50 is formed with a circularly-shaped opening 78 of a size adapted to receive the circular portions 73 of the ratchet component 70, the portions of the support adjacent to and defining the opening 78 being shaped to form a restricted throat as shown in Figure 2 preventing disengagement or lengthwise movement of the ratchet means 70 relative to the support but permitting limited pivotal movement of the ratchet component or arm 70. The lever sections 56 and 58 straddle the toothed ratchet or arm 70 as shown in Figure 4.

Each of the sections 56 and 58 is formed with an inwardly extending circular boss portion 82 as shown in Figures 2 and 4, the adjacent faces of the boss portions 82 being spaced a distance to slidably accommodate the components 71 forming the toothed sector means 70 which arrangement prevents lateral displacement of the member 70. While the toothed member 70 is illustrated as formed of two matching components 71, it may be formed of a single element equal to substantially twice the thickness of one of the components 71.

However it has been found preferable to form the components 70 of two mating sections as the thinner metal may be more readily blanked or cut to desired configuration whereby more accurately shaped teeth 75 may be formed. As the boss portions 82 prevent lateral displacement of the components 71, it has been found unnecessary to weld or otherwise secure members 71 together, although they may be joined if desired.

The lever arrangement 48 is provided with a pawl 85 which is of channel shaped configuration as illustrated in Figure 6 and includes a central bight portion 86 and upwardly extending parallel walls 88 each of the walls being provided with an opening 89 to accommodate a rivet or supporting shaft 90, the latter also extending through suitable openings in the lever sections 56 and 58 providing a pivotal support for the pawl. As illustrated in Figure 2, the pawl 85 is disposed adjacent and above the ratchet teeth 75 of the ratchet arm 70 whereby the extremity of the bight portion 86 of the pawl is disposed for cooperation with the teeth 75 in order to retain the lever 48 in adjusted or brake setting positions.

The pawl or clutch member 85 is biased into engagement with the ratchet teeth 75 under the influence of a spring or resilient means 92, one end of the spring being engaged with a flange 68 at the upper end of the lever construction and the other end engaging the bight portion 86 of the pawl in the manner illustrated in Figure 2. The toothed sector or arm 70 is arranged for limited swinging or pivotal movement about the axis of the circular portion 73 to a position into and out of cooperative relation with the pawl 85.

When the arm or sector 70 is swung downwardly to an ineffective lever retaining position, the pivotal movement of the pawl in a counterclockwise direction as viewed in Figure 2 is determined by engagement of the pawl with the boss portions 82 formed on the lever sections 56 and 58.

A relatively movable means is provided in the form of an elongated member or drawbar 95 providing an abutment means cooperating with the toothed arm or sector 70 for holding the latter in a position whereby the ratchet teeth cooperate with the pawl to hold the lever in adjusted or brake setting positions and for movement to a position permitting the ratchet sector 70 to move out of the path of engagement of the pawl with the ratchet teeth to effect a release of the lever 48 for movement toward brake release position.

The component or drawbar member 95 is formed with a body portion which terminates at one end in an upwardly extending strut or abutment 97, the other end being formed with transversely extending projections 99 which form pintles adapted to be received in openings formed in parallel wall portions 100 of a control member or supplemental lever 102 illustrated in Figures 1 and 2. The supplemental lever or control member 102 is fulcrumed upon a rivet or stub shaft 104 extending through an opening in the support 50 as illustrated in Figure 2. Swinging movements of the arm or supplemental lever 102 effect longitudinal movements of the drawbar or member 95.

The supplemental lever 102 may be fashioned of sheet metal preferably of one piece shaped or bent into U-shaped configuration, the bight portion 106 of which is adapted to accommodate a manipulating rod 108 which may be welded to the bight portion of the supplemental lever 102. The supplemental lever 102 has parallel portions 100 which straddle the support 50, one of the wall portions 100 having a laterally extending flange portion 112 which serves dual purposes as hereinafter explained. The strut portion 97 of the drawbar 95 is joined with the body portion by means of a curved configuration 96.

The upper edge 116 of the support 50 is shaped or arranged at a slight angle with respect to the ledge or abutment surface 77 of the toothed sector 70 whereby movement of the drawbar 95 along the cam surface 116 determines the relative pivotal position of the toothed sector 70. The movement of the retaining means controlling arm or supplemental lever 102 may be determined by an abutment or pin 118 carried by the support 50.

The abutment 118 may be formed as an integral portion struck up from the support 50.

The pin or abutment 118 is engaged by an edge region of the parallel wall 100 of the supplemental lever 102 to limit or define the extent of pivotal movement of the supplemental lever 102 in a clockwise direction as viewed in Figure 2. The lever 102 is biased in a clockwise direction by a spring 122. When the supplemental lever 102 is in the position illustrated in Figure 2, the strut portion 97 of the drawbar 95 is beneath the ledge or surface 77 of the toothed sector 70 and holds or retains the sector in its uppermost position wherein the ratchet teeth 75 are disposed in the path of movement of the pawl 85 so that when the lever 48 is moved to brake setting position, the pawl engages one of the ratchet teeth 75 of the sector 70 in the manner illustrated in Figure 2 and thereby hold the foot-operated lever 48 in brake setting position.

When the supplemental lever 102 is moved in a counterclockwise direction about its pivotal support or fulcrum 104, such movement carries the drawbar 95 in a left-hand direction as viewed in Figure 2 until the strut 97 moves from beneath the ledge 77 and permits the toothed sector 70 to swing about the axis of the circular portion 73 downwardly out of the path of the retaining pawl 85.

The manipulating rod 108 is provided with a hand grip portion 109 which is disposed within convenient reach of the operator to facilitate release of the foot-operated lever 48. It should be noted that the frontal surface 120 adjacent the ledge or abutment surface 77 is angularly disposed with respect to the ledge to facilitate slidable movement of the drawbar to position the strut portion 97 in engagement with the ledge or abutment 77 on the ratchet member 70.

The operation of the arrangement illustrated in Figures 1 through 8 is as follows: The foot-operated brake lever 48 illustrated in Figures 1 and 2 is in brake released position. When the operator desires to set the emergency or parking brakes of the vehicle, foot pressure is exerted upon the pad 63 which swings the lever 48 about its fulcrum 52 in a clockwise direction as viewed in Figure 1. During this movement of the lever 48 to brake setting position, the pawl 85 rides over the teeth 75 of the toothed arm or sector 70, the pawl being biased toward engagement with the teeth under the influence of the spring 92.

When the brakes have been set, the pedal lever 48 is retained in such position by engagement of the pawl 85 with one of the teeth 75. During a brake setting operation as above described, the drawbar 95 is in a position whereby the strut or abutment 97 thereof is in engagement with the ledge or surface 77 of the arm 70 to hold the arm in its uppermost or pawl engaging position. The drawbar 45 is normally held in a position supporting the arm 70 with the teeth 75 in the path of the pawl under the influence of the spring 122 which normally biases the supplemental lever 102 to the position illustrated in Figures 1 and 2.

When the vehicle operator desires to release the emergency brakes, the handle 109 is grasped and lifted upwardly, which action through the rod 108 swings the supplemental or control lever 102 about its fulcrum 104 to move the drawbar 95 in a left-hand direction as viewed in Figure 2, which movement causes the strut or abutment portion 97 to move from beneath the ledge 77 permitting the toothed arm 70 to pivot in a counterclockwise direction about the axis of the circular portion 73 downwardly cut of disengagement with the pawl 85.

The pivotal movement of the pawl is limited by its engagement with the boss portions 82 shown in Figures 3 and 4, the arm 70 swinging to a position beneath the pawl so that the latter is free of the ratchet teeth 75. The tension of the spring 40 shown in Figure 1 and the tension of the brake springs (not shown) exert a pull on the cable 37 to swing the lever 48 in a counterclockwise direction about its fulcrum until the lever is in full brake release position. The movement of the lever 48 to brake release position is cushioned by means of a resilient member or buffer 125 carried by the upper end of the lever as shown in Figure 2, which engages an abutment 127 formed on the support 50.

When the sector or arm 70 is moved out of engagement with the pawl 85 through manipulation of the handle 109 as above-mentioned, the lever 48 is instantly swung toward brake release position and the pawl carried by the lever moved to a region beyond the end of the arm 70 to the position shown in Figure 2.

When the handle is then released, the biasing pressure of spring 122 swings the supplemental control lever 102 in a clockwise direction moving the drawbar 95 in a right-hand direction as viewed in Figure 2 to again bring the abutment or strut 97 beneath the ledge 77. This action elevates or swings the arm clockwise or upwardly as viewed in Figure 2 about the axis of the circular portion 73 to again bring the ratchet teeth 75 to a position in the path of the pawl 85. With the pawl and ratchet means in this position, subsequent movement of the lever 48 toward brake setting position results in the pawl 85 riding over the teeth 75 until a brake setting position is attained and the pawl engages a ratchet tooth to again retain the brakes in set position.

When the drawbar 95 is moved to a position disengaging the strut 97 from the ledge 77 on the arm 70, the arm normally falls or swings downwardly by gravity out of engagement with the pawl 85. However the transversely extending flange portion 112 formed on the upper region of the supplemental lever 102 engages the arm 70 to assure movement of the arm 70 downwardly out of engagement with the pawl. Furthermore when the arm 70 moves downwardly, the downward movement is limited by the ledge 77 engaging the upper surface of the central region of the drawbar 95. As the portion or projection 112 is in engagement with the arm 70 during release movement of the supplemental lever 102, such engagement limits the swinging movement of the control lever 102 during brake lever releasing operations.

Figures 9 and 10 illustrate a modified form of control means for actuating the drawbar to render the lever retaining means effective or ineffective. In this form, the lever 48', the toothed sector or arm 70', the pawl 85' and the drawbar 95' are of substantially the same configuration and shape as the corresponding elements illustrated in the form of the invention of Figures 1 through 8.

In the arrangement illustrated in Figures 9 and 10, the control for the drawbar 95' is inclusive of a foot-operated supplemental lever or member 130. The support 50' may be formed with a downwardly extending portion or projection 132. The supplemental lever or control means 130 for the lever retaining means is fulcrumed upon a stub shaft or rivet 134 which extends through aligned openings in the walls or parallel portions of the lever 130 and an opening in the projection 132. The control or supplemental lever 130 is formed of sheet metal having parallel walls straddling the support 50' and is provided with a foot pad portion 135 to receive foot pressure for actuating the lever 130.

The lever 130 is biased in a counterclockwise direction under the influence of a spring or resilient means 136, one end of the spring engaging an edge region of the support 50' and the other end of the spring contacting one of the wall portions of the lever 130 in the manner illustrated in Figure 9. The swinging movement of the lever 130 is limited in one direction by a pin 140 or by means of a struck up projection formed of the material of the support 50' which is engaged by a wall portion of the lever as shown in Figure 9.

The upper regions of the parallel wall portions of lever 130 are formed with aligned openings to accommodate the pintles or projections 99' formed on the drawbar 95' to establish an operative articulate connection between the foot-operated control lever 130 and the drawbar 95'.

In the arrangement illustrated in Figures 9 and 10, the drawbar 95' is moved in a direction opposite to the movement of the drawbar 95 in the arrangement shown in Figure 2 in order to effect a disengagement of the ratchet teeth 75' from the pawl 85'. In the operation of the arrangement shown in Figures 9 and 10, the lever 48' is moved by foot-operation to a brake set position and the pawl 85' engages one of the teeth 75'' of the arm 70' to hold the main lever 48' in brake setting position. In this position the strut portion 97' of the drawbar is beneath and in engagement with the ledge 77' of the arm 70'.

When the operator desires to release the brake mechanism, foot pressure is applied to the pad 135 to swing the control lever or member 130 about its fulcrum 134 in a clockwise direction. This movement of lever 130 moves the drawbar 95' lengthwise of the arm 70' in a right-hand direction as viewed in Figure 9 to withdraw the strut 97' from beneath the ledge 77', permitting the sector 70' to fall by gravity to disengage the teeth 75' from the pawl 85'. With the teeth 75' thus moved out of the path of the pawl 85' and disengaged therefrom, the lever 48' and the pawl 85' are moved to brake release position by the brake springs and the tension spring 40 shown in Figure 1, the cushion or buffer member 125' engaging the projection 127' formed on the support 50'.

When the operator releases foot pressure upon the control lever 130, the spring 136 biases the lever 130 to the position illustrated in Figure 9 to again bring the strut 97' of the drawbar 95' beneath and in engagement with the ledge or abutment 77' elevating or swinging the arm 70' into a position to bring the teeth 75' in the path of movement of the pawl 85' preparatory to movement of the lever 48' to brake setting position. Through this arrangement a simple yet effective foot-operated control or release means for the lever retaining mechanism is provided.

Figures 11 and 12 illustrate another form of construction for controlling the lever retaining means through the manipulation of a foot-operated member or supplemental lever. In this arrangement, the support 50'', the toothed sector or arm 70'', the pawl 85'' and the drawbar 95'' are of substantially the same construction as the corresponding components illustrated in the form of the invention shown in Figures 1 and 2. The lever construction 48'' is of similar configuration to the lever 48 illustrated in Figure 2 with the exception that the inwardly extending flanges formed on the components 56'' and 58'' are of greater width than the corresponding inwardly turned flanges on the lever construction as illustrated in Figure 3.

Such arrangement is provided whereby the lever sections straddle the wall portions or parallel walls 144 of a control lever or member 140. The control lever 140 for the lever retaining means is preferably formed of sheet metal provided with transversely extending flanges welded to a foot pad portion 142, the parallel wall portions 144 straddle the support 50'' as shown in Figure 12, the wall portions 144 being within the spaced walls of the lever 48'', the latter straddling the support 50'' and the wall portions 144.

The foot-operated lever 48'' is fulcrumed upon a stub shaft or rivet 148 which is of a length to extend through aligned openings formed in the walls 144 of the supplemental lever 140, the parallel wall portions of the main foot-operated lever 48'' and the support 50'' whereby both levers 48'' and 140 are articulately supported or fulcrumed upon the rivet 148. The upper end regions of the wall portions 144 of the control lever 140 are provided with aligned openings to receive the pintles 99'' formed on the drawbar 95''.

As shown in Figure 11, the strut portion 97″ of the drawbar is in engagement with the ledge 77″ of the arm 70″ to support the latter in a position with the teeth 75″ in the path of the pawl 85″. The limit of movement of the control lever 140 in one direction is determined by a pin or struck up projection 150 carried by the support 50″. A contractile spring 152 biases the control lever 140 into a position with the drawbar strut 97″ supporting the arm 70″ in its operative or pawl engaging position, one end of the spring being connected to the control lever as illustrated at 155, the other end of the spring being anchored in an opening 157 formed in the support 50″. Thus the strut 97″ is normally biased under the influence of the spring 152 into a position in engagement with the ledge 77″ of the toothed sector 70″.

When the operator desires to effect a setting of the brake mechanism through the control arrangement illustrated in Figures 11 and 12, foot pressure is exerted upon the pad 63″ to swing the lever 48″ in a clockwise direction about its fulcrum 148 until the brakes attain a set position, the pawl 85″ engaging one of the ratchet teeth 75″ to hold or retain the foot-operated lever 48″ in brake set position.

When it is desired to release the lever 48″, the operator exerts foot pressure upon the pad 142 of the control lever 140, swinging the latter in a clockwise direction about the fulcrum 148, which action moves the drawbar 95″ in a right-hand direction as viewed in Figure 11 to move the strut portion 97″ out of engagement with the ledge or abutment surface 77″ permitting the arm 70″ to fall by gravity to a position out of the path of the pawl 85″. With the arm 70″ in its lowermost position, the pawl 85 is disengaged from the ratchet teeth and the lever 48′ swings to brake release position under the influence of the brake springs and a tension spring 40 of the character illustrated in Figure 1.

When the operator releases pressure on the pad 142 of the control lever, the spring 152 moves the control lever 140 in a counterclockwise direction until the lever 140 engages the pin 150, in which position the strut 97″ of the drawbar again elevates the arm 70″ by engaging the ledge or abutment 77″ to position the ratchet teeth of the arm 70″ in the path of the pawl 85 preparatory to subsequent operation of moving the lever 48″ to a brake setting position.

It is to be understood that the pawls in the several forms of the invention are biased in a direction toward the ratchet teeth of the movable arm or toothed sector and that the downward movement of the pawls in all forms is limited by engagement of the pawls with boss portions of the character illustrated at 82 in Figure 4.

It is apparent that, within the scope of the invention, modifications and different arrangements may be made other than is herein disclosed, and the present disclosure is illustrative merely, the invention comprehending all variations thereof.

I claim:

1. Mechanism control of the character disclosed, in combination, a support, a main foot-operated lever fulcrumed on the support, a member formed with ratchet teeth movably mounted upon the support, a pawl pivotally mounted on the main lever, resilient means normally biasing the pawl into engagement with the teeth of the member, a cam surface mounted by the support, a bar disposed between the cam surface and the ratchet member and arranged to support the ratchet member in a position to be engaged by the pawl, said cam surface and bar being shaped whereby movement of the bar relative to the cam surface permits movement of the ratchet member out of engaging relation with said pawl, means for effecting movement of the bar relative to the cam surface, said means including a supplemental lever having operative connection with the bar, and abutment means for limiting the movement of said supplemental lever in one direction.

2. Mechanism control of the character disclosed, in combination, a support, a main foot-operated lever fulcrumed on the support, a member formed with ratchet teeth pivotally mounted upon the support, a pawl pivotally mounted on the main lever, resilient means normally biasing the pawl into engagement with the teeth of the member, a cam surface mounted by the support, a bar disposed between the cam surface and the ratchet member and arranged to support the ratchet member in a position to be engaged by the pawl, said cam surface and bar being shaped whereby movement of the bar relative to the cam surface enables movement of the ratchet member out of engaging relation with said pawl, means for effecting movement of the bar relative to the cam surface, said means including a supplemental lever having operative connection with the bar, abutment means for limiting the movement of said supplemental lever in one direction, and resilient means biasing the supplemental lever into engagement with the abutment means.

3. Mechanism control of the character disclosed, in combination, a support, a main foot-operated level fulcrumed on the support, a member formed with ratchet teeth pivotally mounted upon the support, a pawl pivotally mounted on the main lever, resilient means normally biasing the pawl into engagement with the teeth of the member, a cam surface formed on the support, a bar disposed between the cam surface and the ratchet member and arranged to support the ratchet member in a position to be engaged by the pawl, said cam surface and bar being shaped whereby movement of the bar relative to the cam surface permits movement of the ratchet member out of engaging relation with said pawl means for effecting movement of the bar relative to the cam surface, said means including a supplemental lever having operative connection with the bar, abutment means for limiting the movement of said supplemental lever in one direction, and resilient means biasing the supplemental lever into engagement with the abutment means, and a hand grip member connected with the supplemental lever.

4. Mechanism for controlling vehicle brakes, in combination, a support, a foot-operated lever articulately carried by the support and adapted to be connected with brakes of the vehicle, lever retaining means for holding the lever in adjusted positions, said lever retaining means including a ratchet member and a pawl member, one of said members being connected with the main lever and the other being connected with the support, a cam surface formed on the support, an element slidable along the cam surface and arranged for engagement with one of said members, means connected with the element for effecting relative slidable movement of said element along the cam surface to change the position of the member engaged by the element, and resilient means normally biasing the element to a position maintaining the ratchet and pawl members in operative engagement, and means for limiting slidable movement of the element in one direction.

5. Mechanism for controlling vehicle brakes, in combination, a support, a foot-operated main lever articulately carried by the support and adapted to be connected with brakes of the vehicle, lever retaining means associated with the main lever for holding the lever in adjusted positions, said lever retaining means including a ratchet member articulately carried by the support, a pawl pivotally mounted upon the lever, a cam surface formed on the support, a relatively movable drawbar engaging said cam surface and having a portion normally in engagement with the ratchet member for retaining the teeth of the ratchet member in the pah of the pawl, resilient means biasing the drawbar to such position, and a supplemental lever connected with the drawbar for changing the position thereof relative to the cam surface and the ratchet member to effect movement of the ratchet member out of the path of movement of the pawl for releasing the main lever, and means for limiting slidable movement of the drawbar in one direction.

References Cited in the file of this patent

UNITED STATES PATENTS

| | | |
|---|---|---|
| 463,433 | Angerer | Nov. 17, 1891 |
| 738,100 | Cuntz | Sept. 1, 1903 |
| 1,323,661 | Urton | Dec. 2, 1919 |
| 1,454,398 | MacKenzie | May 8, 1923 |
| 2,467,557 | Jandus | Apr. 19, 1949 |
| 2,694,945 | Jandus | Nov. 23, 1954 |
| 2,835,140 | Cox | May 20, 1958 |
| 2,851,900 | Powell | Sept. 16, 1958 |
| 2,875,641 | Powell | Mar. 3, 1959 |
| 2,908,185 | Koskela | Oct. 13, 1959 |